United States Patent
Curd et al.

(10) Patent No.: US 11,540,049 B1
(45) Date of Patent: Dec. 27, 2022

(54) SYSTEM AND METHOD FOR AN AUDIO REPRODUCTION DEVICE

(71) Applicant: SCAEVA TECHNOLOGIES, INC., Gilroy, CA (US)

(72) Inventors: Steven Elliott Curd, Gilroy, CA (US); Wendy Susan Curd, Gilroy, CA (US)

(73) Assignee: Scaeva Technologies, Inc., Gilroy, CA (US)

( * ) Notice: Subject to any disclaimer, the term of this patent is extended or adjusted under 35 U.S.C. 154(b) by 0 days.

(21) Appl. No.: 16/927,792

(22) Filed: Jul. 13, 2020

Related U.S. Application Data

(60) Provisional application No. 62/873,803, filed on Jul. 12, 2019.

(51) Int. Cl.
- *H04R 3/12* (2006.01)
- *H04R 3/04* (2006.01)
- *G06F 3/16* (2006.01)

(52) U.S. Cl.
CPC ............... *H04R 3/12* (2013.01); *G06F 3/162* (2013.01); *G06F 3/165* (2013.01); *H04R 3/04* (2013.01)

(58) Field of Classification Search
CPC .. H04R 3/12; H04R 3/04; G06F 3/162; G06F 3/165
USPC .............. 381/1, 17, 18, 19, 303, 309, 26, 74
See application file for complete search history.

(56) References Cited

U.S. PATENT DOCUMENTS

| | | | | |
|---|---|---|---|---|
| 5,521,981 A | * | 5/1996 | Gehring | H04S 1/002 381/17 |
| 5,970,153 A | * | 10/1999 | Petroff | H04R 5/04 381/28 |
| 8,488,807 B2 | * | 7/2013 | Chiba | H04R 3/04 381/94.1 |
| 9,794,717 B2 | * | 10/2017 | Araki | H04S 7/30 |
| 2004/0196991 A1 | * | 10/2004 | Iida | H04S 1/005 381/1 |
| 2007/0003075 A1 | * | 1/2007 | Cooper | H04S 3/00 381/98 |
| 2009/0208027 A1 | * | 8/2009 | Fukuda | H04R 3/02 381/71.6 |
| 2011/0038490 A1 | * | 2/2011 | Yang | H03G 5/165 381/103 |

* cited by examiner

*Primary Examiner* — Xu Mei
(74) *Attorney, Agent, or Firm* — Raghunath S. Minisandram

(57) ABSTRACT

System and method for enhancing audio reproduced by an audio reproduction device is described. A plurality of convolution coefficients are generated for a predefined space. A digital audio signal is modified based on the generated convolved digital audio signal to generate a convolved digital audio signal. The convolved digital audio signal is converted to a convolved analog audio signal. The convolved analog audio signal is fed to the audio reproduction device.

20 Claims, 8 Drawing Sheets

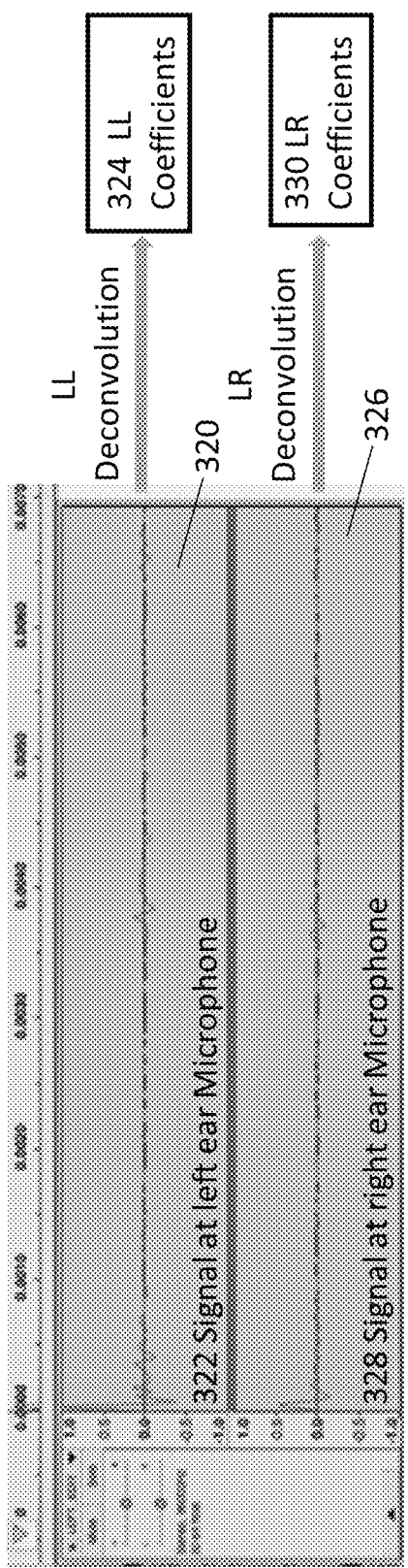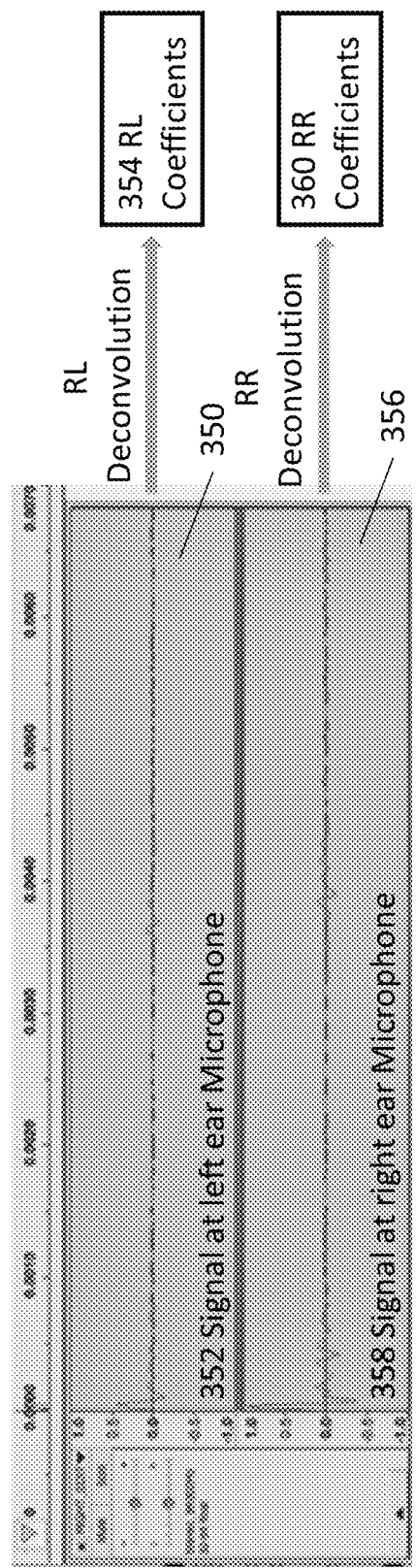
FIGURE 3C
FIGURE 3D

SYSTEM AND METHOD FOR AN AUDIO REPRODUCTION DEVICE

CROSS-REFERENCE TO RELATED APPLICATIONS

This application claims priority to provisional patent application No. 62/873,803 filed on Jul. 12, 2019, entitled "SYSTEM AND METHOD FOR AN AUDIO REPRODUCTION DEVICE", which is incorporated herein by its entirety.

TECHNICAL FIELD

The present invention relates generally to an audio reproduction device, and, more particularly, to a head phone.

DESCRIPTION OF RELATED ART

System and method for an audio reproduction device is described. Audio sound reproduction devices may include headphones and earbuds. Humans have evolved to hear sounds within physical spaces. The physical configuration of our two ears, our head between them, and the ways in which we perceive sound is the result of the interface with, and the physical characteristics of, the environment within which sounds are created and transported. However, since the introduction of the Walkman® in 1979, headphones (and later earbuds) became very popular ways to enjoy listening to sound. By closely coupling two sound transducers with our two ears independently, all of environmental effects and the natural perception of sound are circumvented. This creates a synthetic, artificial listening environment, and substantially changes our psychoacoustic interpretation of the sounds that we hear.

Further, entertainment content such as music and film soundtracks are typically created in carefully designed physical environments (studios and sound stages). Therefore, by listening to the resulting music or film soundtracks through headphones, our psychoacoustic experience is typically significantly different than that which was intended by the creators, producers or editors of the content. This presents numerous problems. In some examples, creating content using headphones is highly challenging, therefore requiring carefully designed studio spaces and expensive monitor loudspeakers. In some examples, a listener's psychoacoustic experience while consuming audible content is different when accessed through loudspeakers versus headphones. There is a need to solve one or more of these problems. It is with these needs in mind, this disclosure arises.

SUMMARY OF THE INVENTION

In one embodiment, a method for enhancing audio reproduced by an audio reproduction device is disclosed. A plurality of convolution coefficients are generated for a predefined space. A digital audio signal is modified based on the generated convolved digital audio signal to generate a convolved digital audio signal. The convolved digital audio signal is converted to a convolved analog audio signal. The convolved analog audio signal is fed to the audio reproduction device.

In another embodiment, a system for enhancing audio reproduced by an audio reproduction device is disclosed. A plurality of convolution coefficients are generated for a predefined space. A digital audio signal is modified based on the generated convolved digital audio signal to generate a convolved digital audio signal. The convolved digital audio signal is converted to a convolved analog audio signal. The convolved analog audio signal is fed to the audio reproduction device.

This brief summary has been provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are now described with reference to the drawings. In the drawings, the same components have the same reference numerals. The illustrated embodiments are intended to illustrate but not limit the invention. The drawings include the following Figures:

FIG. 3C shows a graph with signal measured at left ear microphone from the sound received from the left speaker and another graph with signal measured at right ear microphone from the sound received from the left speaker 302, according to an example of this disclosure;

FIG. 3D shows a graph with signal measured at left ear microphone from the right speaker, and another graph with signal measured at right ear microphone from the sound received from the right speaker, according to an example of this disclosure;

DETAILED DESCRIPTION

Figure 1:
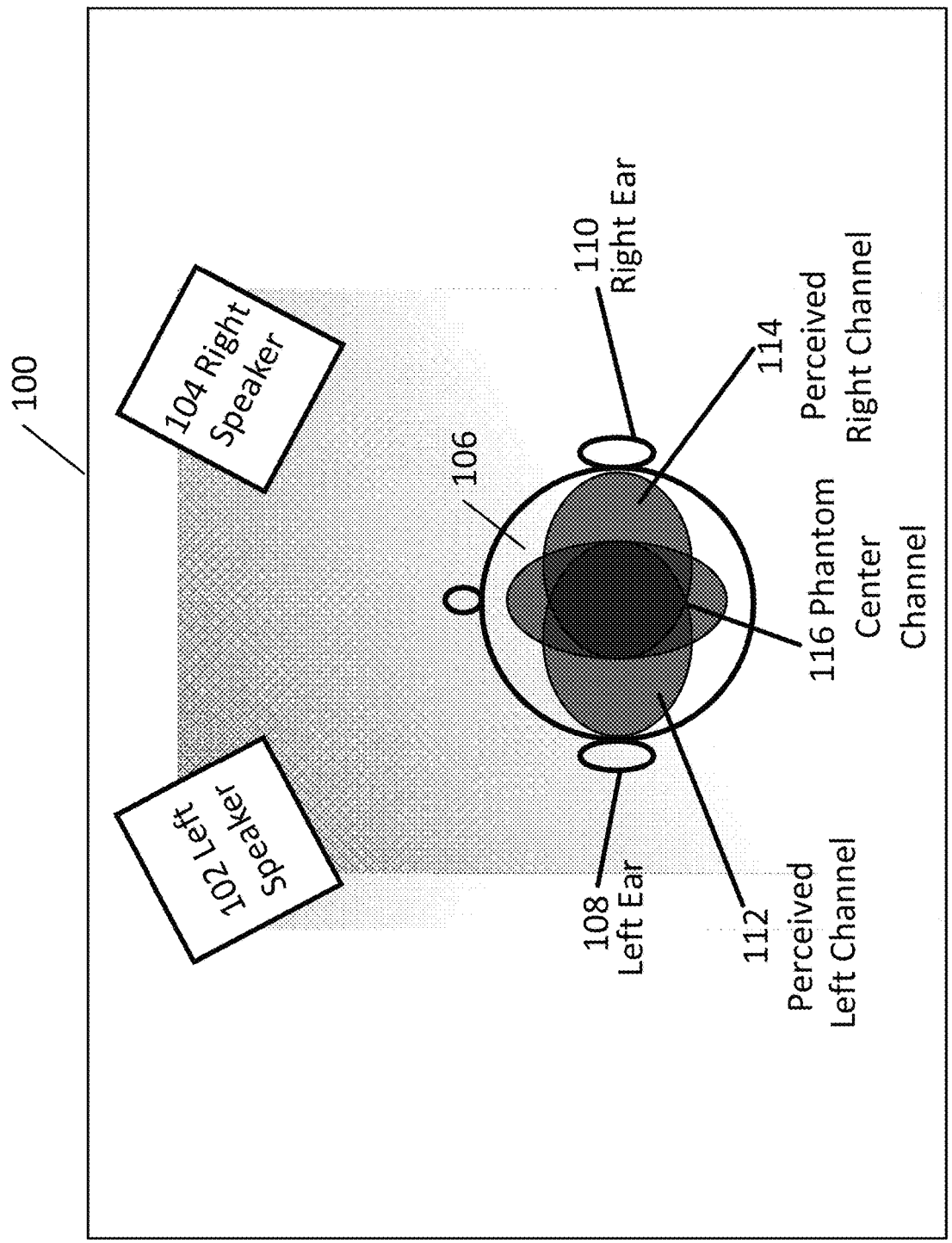
FIG. 1 shows an example listening environment, with left speaker and right speaker, according an example of this disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose an audio reproduction device. Referring now to the drawings, where similar reference characters denote corresponding features consistently throughout the figures, various examples of this disclosure is described.

FIG. 1 shows an example listening environment 100 with left speaker 102 and right speaker 104, with a listener 106 selectively positioned to listen to the audio reproduced by the left speaker 102 and right speaker 104, through a combination of left ear 108 and right ear 110 of the listener 106. As one skilled in the art appreciates, the left ear 108 of the listener 106 primarily listens to audio reproduced by left speaker 102 and secondarily listens to the audio reproduced by the right speaker 104. Similarly, the right ear 110 of the listener 106 primarily listens to audio reproduced by right speaker 104 and secondarily listens to the audio reproduced by the left speaker 102. Left channel perceived by the listener 106 is depicted by the left shaded area 112. Right channel perceived by the listener 106 is depicted by the right shaded area 114. As one skilled in the art appreciates, the left shaded area 112 overlaps with the right shaded area 114. Further, a phantom center channel 116 is perceived by the listener 106.

Figure 2:
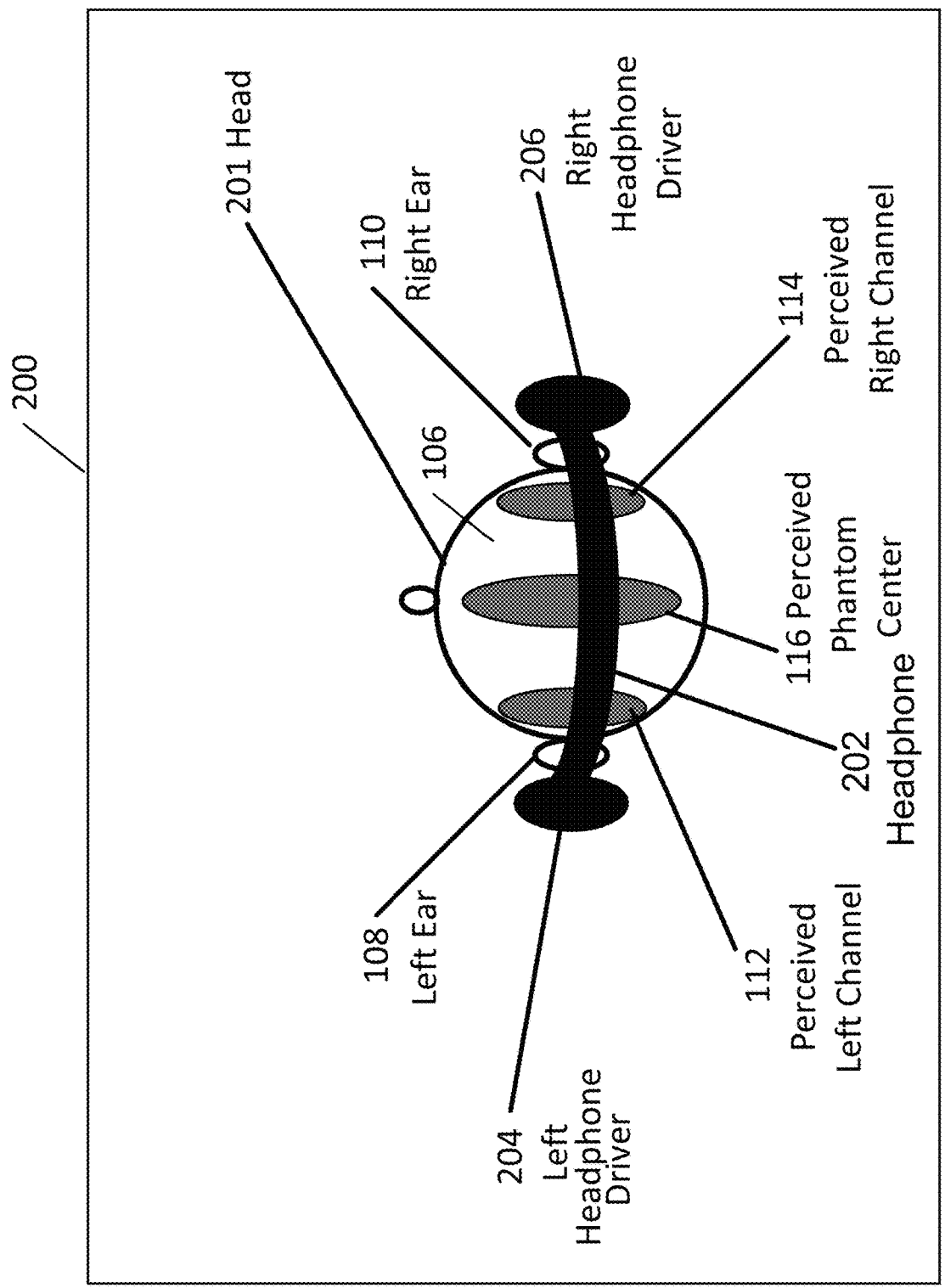
FIG. 2 shows another example listening environment, with left speaker and right speaker, according to an example of this disclosure.

FIG. 2 shows another example listening environment 200. In this listening environment 200, the listener 106 is using a headphone 202, with a left headphone driver 204 placed around, in or near the left ear 108 and a right headphone driver 206 placed around, in or near the right ear 110. The listener 106 selectively listens to the audio reproduced by the left head phone driver 204 through the left ear 108. The listener 106 also listens to the audio reproduced by the right head phone driver 206 through the right ear 110. Left channel perceived by the listener 106 is depicted by the left shaded area 112. Right channel perceived by the listener 106 is depicted by the right shaded area 114. As one skilled in the art appreciates, in this example, the left shaded area 112 does not overlap with the right shaded area 114. Further, a phantom center channel 116 is perceived by the listener 106. In this example, the phantom center channel 116 perceived by the listener 106 is narrower than as perceived in the example listening environment 100 described with reference to FIG. 1. In other words, the listener 106 in listening environment 200 experiences a materially different sound perception as compared to the listening environment 100. The consequences of this modified perception are broad. In some cases, the perceived locations of particular sounds are changed. In other cases, the lack of environmental effects such as indirect sounds resulting from reflective surfaces within a physical room or space are removed.

According to an example of this disclosure, real-time convolution to the digital sound signals are applied, with separate convolution functions for each incoming channel, and for each ear. For example, with a two-channel stereo signal, convolutions will be applied in real-time for the left channel to the left ear sometimes referred to as a LL convolution, left channel to the right ear, sometimes referred to as a LR convolution, right channel to the left ear, sometimes referred to as a RL convolution and right channel to the right ear, sometimes referred to as RR convolution.

In one example, each convolution function applies pre-calculated coefficients, associated with the impulse response data from a specific physical space. The number of coefficients for each convolution set can be calculated as follows: n=s*t, where n is the number of coefficients per convolution set, s is the sample rate of the digital signal source in samples per second, and t is the maximum convolution time in seconds. For example, with a signal sample rate of 64,000 samples per second and 0.25 seconds of maximum convolution time, n of 16,000 coefficients are required.

In one example, a non-linear bass distortion (NLBD) function generator is used to digitally generate a controlled harmonic distortion (sometimes referred to as CH distortion) associated with physical subwoofers. The digital NLBD function generator includes a low-pass filter to separate only low frequencies, circuit to generate even and/or odd harmonics, and another low-pass filter. The generated CH distortion is then mixed with the original signal.

In one example, a middle-side filter (MS filter) circuit is used to adjust the physical separation of the original sound source, which may be referred to as the perceived "sound stage". In the case of stereo signal, middle-side filter determines the perceived distance between the right and left virtual speakers within this sound stage. One implementation of a MS filter includes summing the signals from the left and right channels to create a "middle" signal. It also includes calculating the difference between the signals from the left and right channels to create a separate "side" signal. The middle channel then contains just the information that appears in both the left and right channels, and the side channel contains all the information that differs between the left and right channels. In other words, the middle signal represents sounds that would be perceived by a listener to be emanating mainly from a center location. Similarly, the side signal represents sounds that would be perceived by a listener to be emanating from either the left or right sides of the perceived sound stage. Therefore, by independently amplifying or attenuating the middle and side signals, it is possible to emphasize or reduce sound that appear to originate from either the center or the left and right sides of the perceived sound stage. Among other things, this has the effect of determining how far apart the virtual speakers are located within the perceived sound stage. After applying the amplification or attenuation of the middle and side signals, they are then subsequently summed together and divided by 2 to re-create the left signal, and subtracted from each and divided by 2 to recreate the right signal.

Given:
L=left signal
R=right signal
M=middle signal
S=side signal
MG=center gain; >1 represents amplification, 0<MG<1 represents attenuation
SG=side gain; >1 represents amplification, 0<SG<1 represents attenuation
Then:

$$M=MG*(L+R) \qquad \text{Equation 1}$$

$$S=SG*(L-R) \qquad \text{Equation 2}$$

Finally:

$$\text{Recreated Left Signal } L'=0.5*(M+S) \qquad \text{Equation 3}$$

$$\text{Recreated Right Signal } R'=0.5*(M-S) \qquad \text{Equation 4}$$

A combination of one or more of the convolution coefficients, CH distortion and MS filter may be applied to the original digital sound. Such a corrected digital sound may assist in recreating the perception of listening to sound as if it were being reproduced by loudspeakers in a defined (modeled) space. For example, the LL, LR, RL and RR convolutions emulate the sounds that would be received by the listener's ears within the modeled space. Instead of perceiving a narrow phantom center channel, the listener's brain reconstructs the processed left and right analog signals reproduced by the left and right headphone drivers into a natural left and right channels, and enables reconstruction of an accurate center channel.

To generate the required convolution coefficients, the desired (modeled) space must be evaluated. Now, referring to FIG. 3A and FIG. 3B desired space 300 is shown, with left speaker 302 and right speaker 304 positioned within the desired space 300.

A left ear microphone 306 and a right ear microphone 308 are selectively placed within the desired space 300, for example, at locations that may substantially correspond to a listener's left ear and right ear respectively.

Figure 3A:
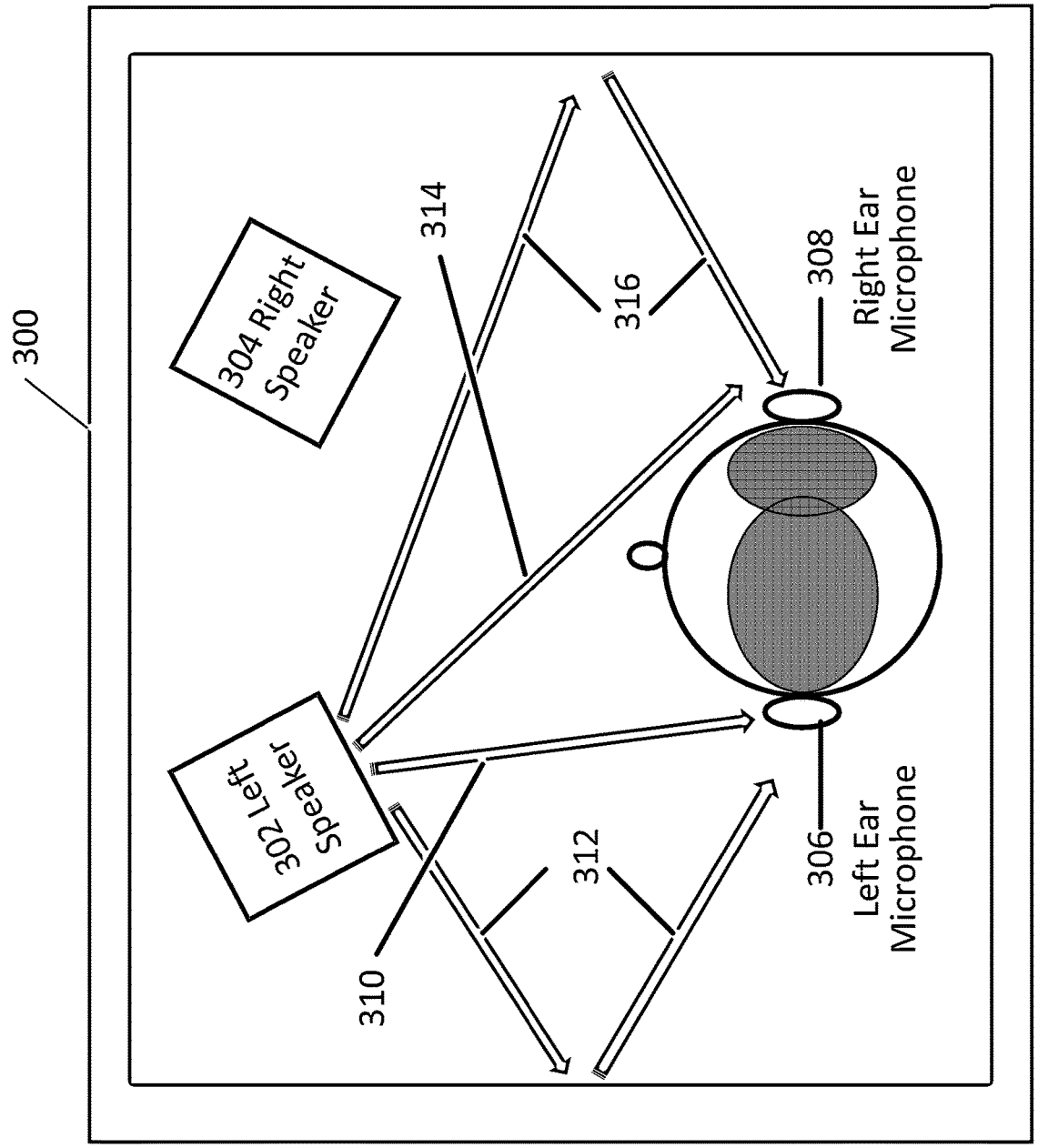
FIGS. 3A and 3B show desired space, with left speaker and right speaker positioned within the desired space, according to an example of this disclosure.

Now, referring to FIG. 3A, left speaker 302 is selectively energized with a known signal. Sound produced by the left speaker 302 is received by both the left ear microphone 306 and the right ear microphone 308. The sound received by the left ear microphone 306 includes a combination of direct signal (as shown by arrow 310) and reflected signals (as shown by arrow 312) off of the acoustically reflective surfaces of the desired space 300. The sound received by the right ear microphone 308 includes a combination of direct signal (as shown by arrow 314) and reflected signals (as shown by arrow 316) off of acoustically reflective surfaces of the desired space 300. As one skilled in the art appreciates, the reflected signal may be from a plurality of reflective surfaces, including walls, ceiling, floor, and other objects located within the desired three-dimensional space 300. Received signal by the left ear microphone 306 and right ear microphone 308 from the left speaker 302 are recorded and deconvolved.

For example, the signal received at the left ear microphone 306 from the left speaker 302 is deconvolved to generate the LL coefficients. The signal received at the right ear microphone 308 from the left speaker 302 is deconvolved to generate the LR coefficients.

Referring to FIG. 3C, graph 320 shows signal 322 measured at left ear microphone 306 from the sound received from the left speaker 302, which is deconvolved to generate LL coefficients 324. And, graph 326 shows signal 328 measured at right ear microphone 308 from the sound received from the left speaker 302, which is deconvoled to generate the LR coefficients 330.

Figure 3B:
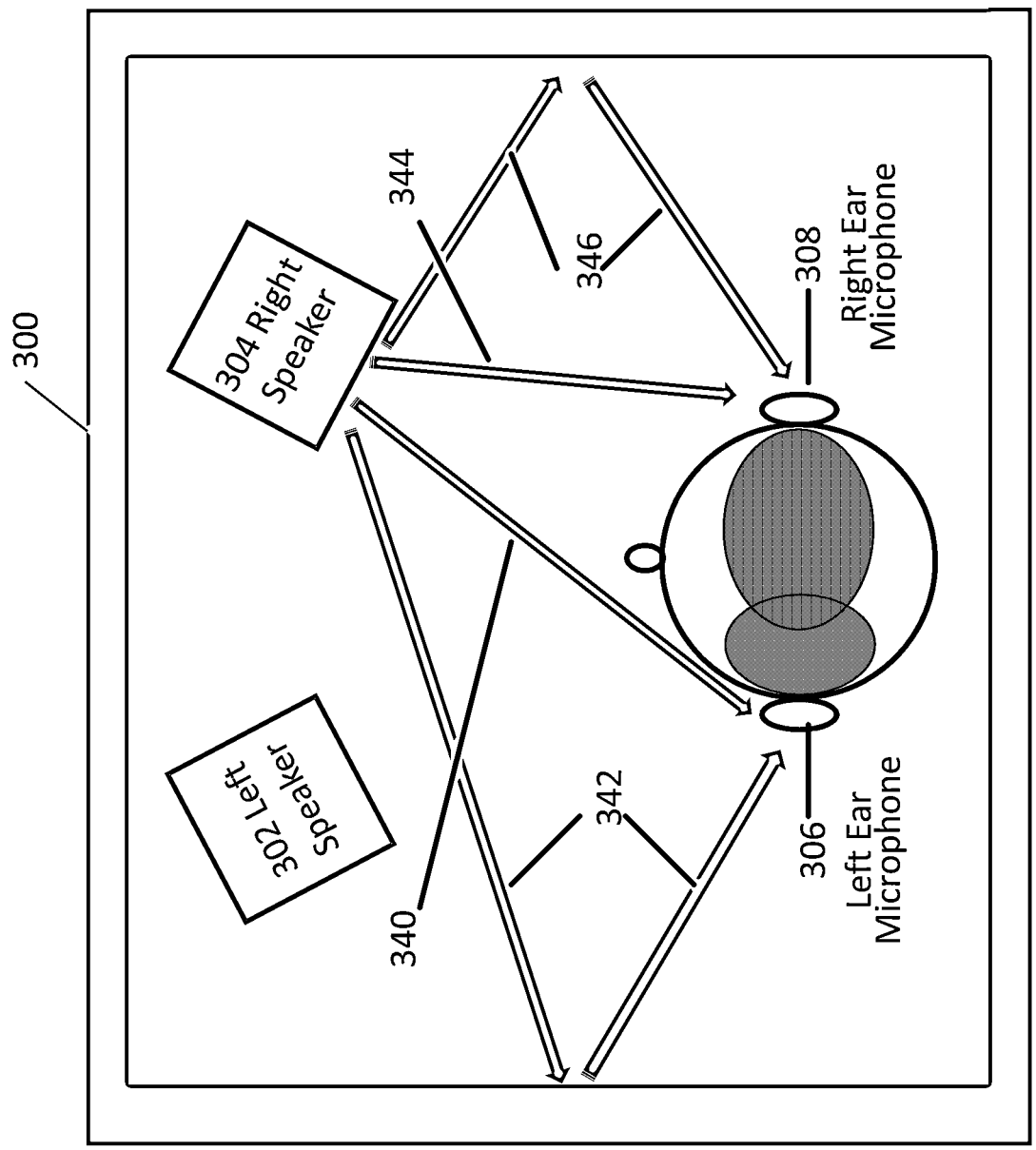

Now, referring to FIG. 3B, right speaker 304 is selectively energized with a known signal. Sound produced by the right speaker 304 is received by both the left ear microphone 306 and the right ear microphone 308. The sound received by the left ear microphone 306 includes a combination of direct signal (as shown by arrow 340) and reflected signal (as shown by arrow 342) off of the acoustically reflective surfaces of the desired space 300. The sound received by the right ear microphone 308 includes a combination of direct signal (as shown by arrow 344) and reflected signal (as shown by arrow 346) off of the acoustically reflective surfaces of the desired space 300. As one skilled in the art appreciates, the reflected signal may be from a plurality of reflective surfaces, including walls, ceiling, floor, and other objects located within the desired space 300. Received signal by the left ear microphone 306 and right ear microphone 308 from the right speaker 304 are recorded and deconvolved.

For example, the signal received at the left ear microphone 306 from the sound received from the right speaker 304 is deconvolved to generate the RL coefficients. Referring to FIG. 3D, graph 350 shows signal 352 measured at left ear microphone 306 from the right speaker 304 which is deconvolved to generate RL coefficients 354. The signal received at the right ear microphone 308 from the sound received from the right speaker 304 is deconvolved to generate the RR coefficients. And, graph 356 shows signal 358 measured at right ear microphone 308 from the sound received from the right speaker 304, which is deconvoled to generate the RR coefficients 360.

Figure 4:
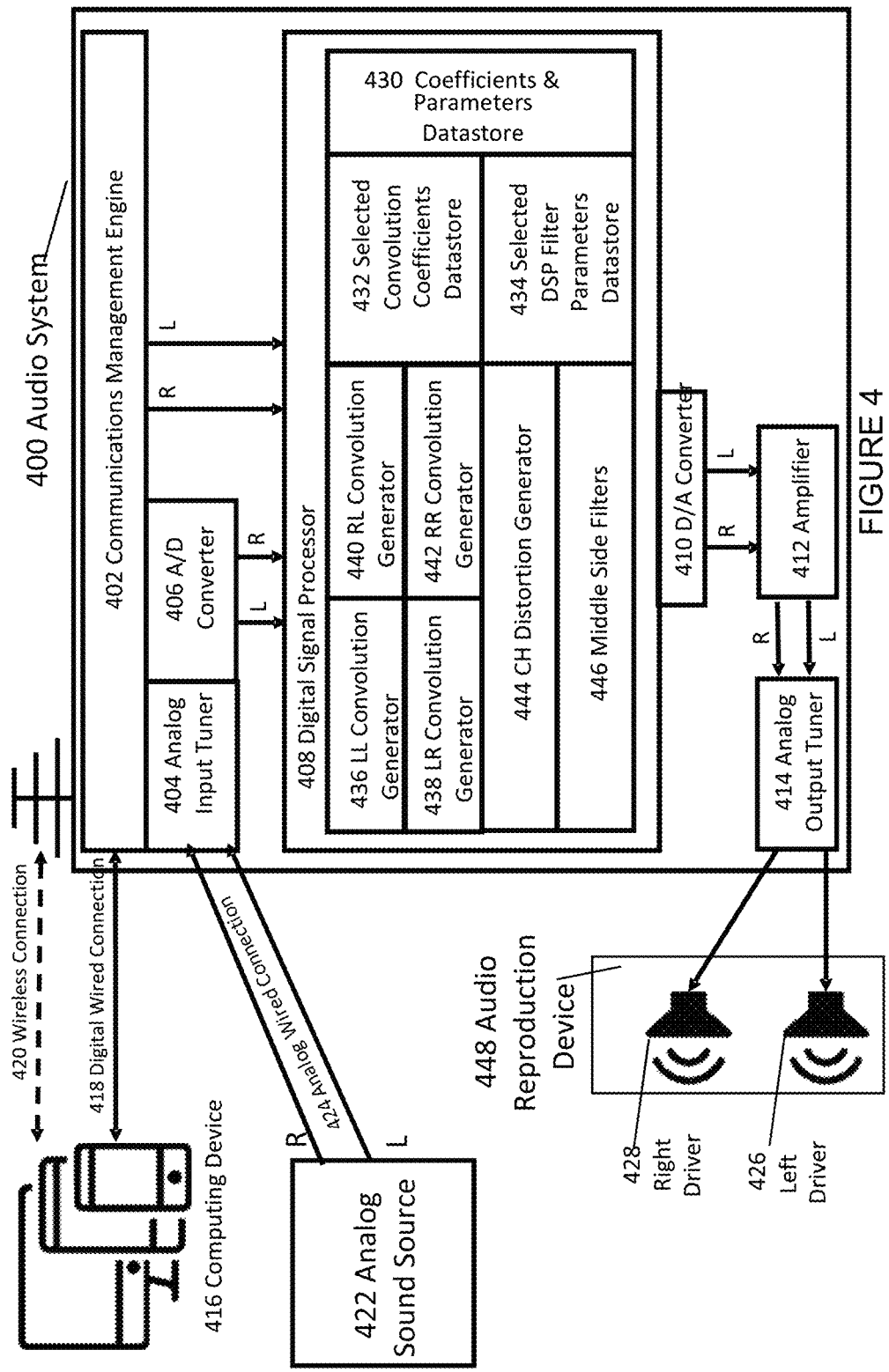
FIG. 4 shows an example audio system, according to an example of this disclosure.

In one example, a digital signal processor may be configured to modify input signal based on the convolution coefficients measured for a modeled space. Now, referring to FIG. 4, an example audio system 400 is described. The audio system 400 includes a communication management engine 402, an analog input tuner 404, A/D (analog to digital) converter 406, a digital signal processor (DSP) 408, a D/A (digital to analog) converter 410, an amplifier 412 and an analog output tuner 414.

The communication management engine 402 is configured to communicate with external devices, for example, computing device 416, over a wired connection 418 or a wireless connection 420. In one example, the communication management engine 402 is configured to communicate with the computing device 416 and receive various parameters for configuring the audio system 400, including the digital signal processor 408. In one example, the communication management engine 402 is configured to receive digital audio signal to be reproduced by the audio system 400, over the wired connection 418 or wireless connection 420. The received digital audio signal (for example, two channel digital audio signals L and R) is fed to the DSP 408.

The analog input tuner 404 is configured to communicate with an analog sound source 422, for example, over an analog wired connection 424, to receive audio signal to be reproduced by the audio system 400. In one example, a two-channel audio signal (left and right) is received. The analog input tuner 404 is configured to optimize impedance and frequency response characteristics of the analog audio signal received from the analog audio source 422. The output of the analog input tuner 404 is fed to the A/D converter 406, to generate digital audio signal (for example, two channel digital audio signals L and R). The digital audio signal is fed to the DSP 408.

The DSP 408 processes the received digital audio signal, applying modifications to the received digital audio signal, based on the convolution coefficients, generated CH distortion and the middle-side filter (MS filter) digital settings. Modified digital audio signal is then fed to the D/A converter 410 to generate modified analog audio signal. The modified analog audio signal in some examples may be amplified by the amplifier 412 to generate an amplified modified analog audio signal. The amplified modified analog audio signal is then fed to an analog output tuner 414. The analog output tuner 414 feeds the amplified modified analog audio signal to left driver 426 and right driver 428, for reproduction of the amplified modified analog audio signal. As one skilled in the art appreciates, if the amplifier 412 is not used, the modified analog audio signal will be fed to the analog output tuner 414 which in turn will feed the modified analog audio signal to the left driver 426 and the right driver 428, for reproduction of the modified analog audio signal. The analog output tuner 414 is configured to optimize impedance and frequency response characteristics of the modified analog audio signal for the left driver 426 and the right driver 428.

Having described the general operation of the audio system 400, functions and features of the DSP 408 will now be described. In general, the DSP 408 is configured to receive digital audio signal (for example, as L and R signals) from the A/D converter 406 (for audio received from an analog audio source) or the communication management engine 402 (for audio received from a digital audio source). The DSP 408 then selectively modifies the received digital audio signal to generate the modified digital audio signal and output the modified digital audio signal, to be fed to the D/A converter 410.

The DSP 408 includes a coefficients and parameters data store 430, a selected convolution coefficients data store 432, a selected DSP filter parameters data store 434, a LL convolution generator 436, a LR convolution generator 438, a RL convolution generator 440, a RR convolution generator 442, a CH distortion generator 444 and a middle-side filter circuit 446. The coefficients and parameters data store 430 stores various coefficients and parameters for one or more modeled space. In one example, various coefficients and parameters are received by the communication management engine 402, from an external computing device and loaded into the coefficients and parameters data store 430.

When a specific modeled space is selected, corresponding coefficients and parameters are retrieved from the coefficients and parameters data store 430 and selectively loaded into the selected convolution coefficients data store 432 and the selected DSP filter parameters data store 434. As one skilled in the art appreciates, the selected convolution coefficients data store 432 and the selected DSP filter parameters data store 434 may be configured to be high speed memory, so that data may be retrieved from them at a speed to process the data in real time.

The LL convolution generator 436, a LR convolution generator 438, a RL convolution generator 440, a RR convolution generator 442 selectively retrieve the selected convolution coefficients from the selected convolution coefficients data store 432 and apply appropriate convolution to each of the channels (L and R) of the digital audio signal to generate a convolved digital audio signal. The convolved digital audio signal is then fed to the D/A converter 410, to generate modified analog audio signal.

In one example, the CH distortion generator 444 adds CH distortion to the convolved digital audio signal. The middle-side filter circuit 446 based on the selected parameters, applies appropriate correction to the convolved digital audio signal with CH distortion, to generate the modified digital audio signal. The modified digital audio signal is then fed to the D/A converter 410, to generate modified analog audio signal.

In one example, the audio system 400 may be selectively placed within an enclosure of an audio reproduction device 448. The audio reproduction device 448 may be a headphone with the left driver 426 and the right driver 428. Additionally, any power source needed to operate the audio system 400 may also be selectively placed within the enclosure of the audio reproduction device 448.

Figure 5:
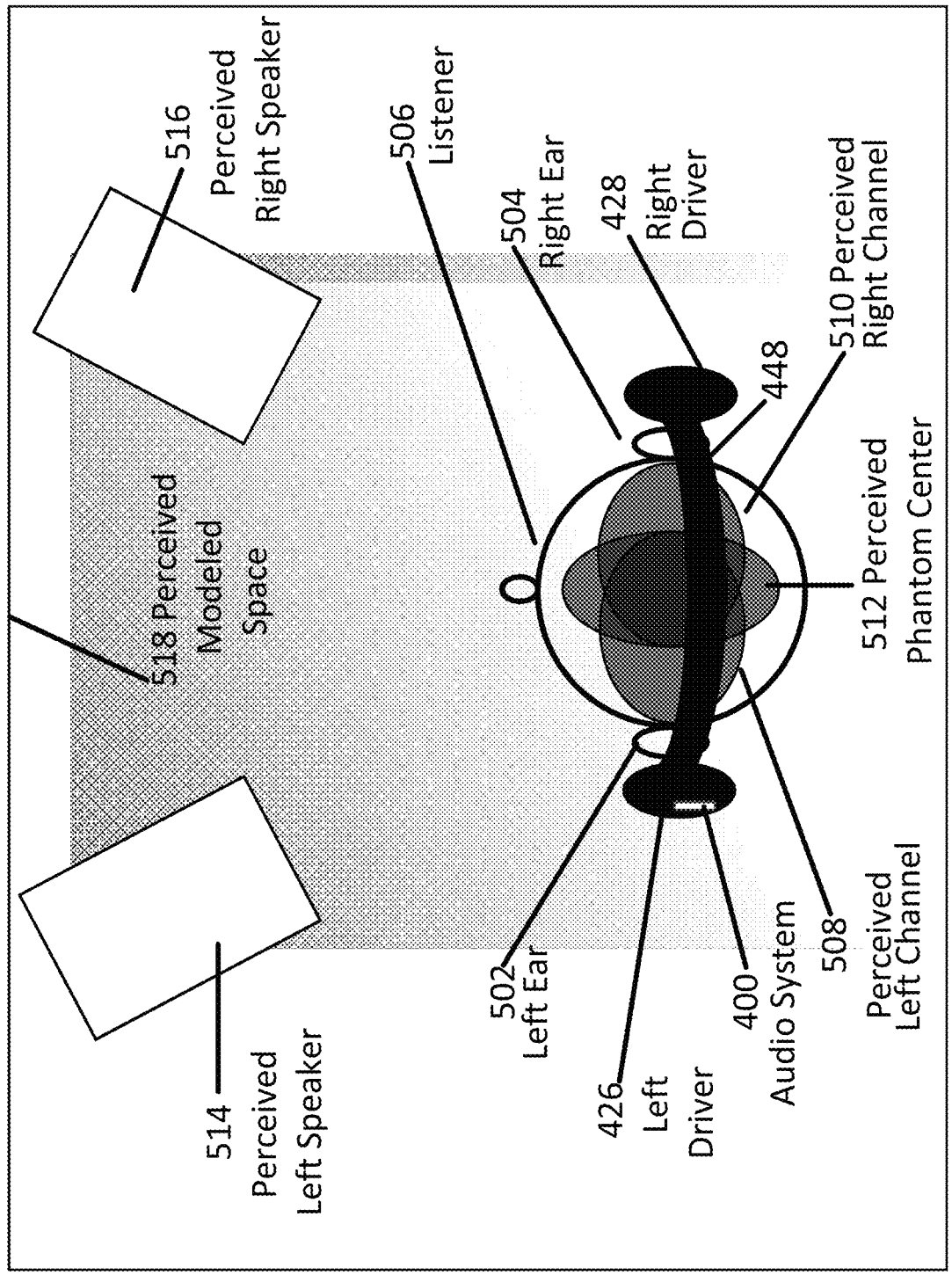
FIG. 5. shows an audio reproduction device placed within the audio system of FIG. 4, according to an example of this disclosure.

Now, referring to FIG. 5, audio reproduction device 448, with left driver 426 and right driver 428 is shown. In this example, the audio system 400 is selectively placed within the audio reproduction device 448, for example, within the enclosure surrounding the left driver 426. The audio reproduction device 448 is selectively placed relative to the left ear 502 and right ear 504 of a listener 506. The modified analog audio signal is reproduced by the left driver 426 and the right driver 428, with an overlapping perceived left channel 508, perceived right channel 510, and a perceived phantom center channel 512. In one example, the listener 506 will have a perception that the sound is emanating from a perceived left loud speaker 514 and perceived right loudspeaker 516, selectively placed within the modeled space 518 from which convolution coefficients were derived.

Figure 6:
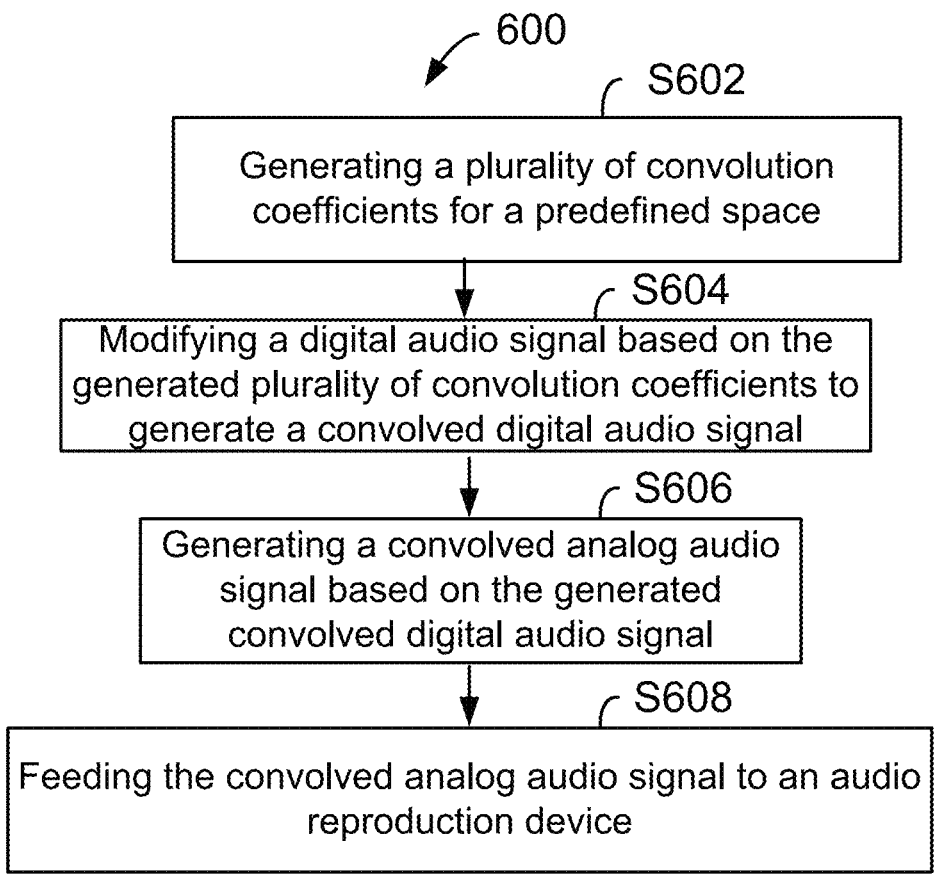
FIG. 6 shows an example flow diagram, according to an example of this disclosure.

Now, referring to FIG. 6, an example flow diagram 600 is described. In block S602, a plurality of convolution coefficients for a predefined space is generated. For example, as previously described, LL convolution coefficient, LR convolution coefficient, RL convolution coefficient and RR convolution coefficient for a predefined space is generated, as previously described.

In block S604, a digital audio signal is modified based on the generated plurality of convolution coefficients, to generate a convolved digital audio signal. For example, as previously described with reference to FIG. 4, an audio system 400 may be configured to modify a digital audio signal, based on the generated plurality of convolution coefficients, to generate a convolved digital audio signal. In some examples, the convolved digital audio signal may be further modified by adding a CH distortion. In some examples, the convolved digital audio signal may be further modified by a middle-side filter circuit, based on selected parameters.

In block S606, a convolved analog audio signal is generated based on the generated convolved digital audio signal. For example, as previously described with reference to FIG. 4, an audio system 400 may be configured to generate the convolved analog audio signal based on the generated convolved digital audio signal. For example, the D/A converter 410 may be conveniently configured to generate the convolved analog audio signal based on the generated convolved digital audio signal. In some examples, the convolved digital audio signal further modified by adding CH distortion and middle-side filter circuit, referred to as modified digital audio signal may be fed to the D/A converter 410 to generate the convolved analog audio signal based on the generate modified digital audio signal.

In block S608, the generated convolved analog audio signal is fed to an audio reproduction device. For example, generated convolved analog audio signal if fed to the audio reproduction device 448, as previously described.

Example Application 1

People who create professional audio content, including but not limited to musicians, recording engineers, producers, sound producers, mixers, often struggle due to the limitations of traditional headphones. This requires them to seek professionally-treated physical spaces to deliver professional-sounding content. This includes high fidelity loudspeakers, carefully designed positioning and geometry of hard surfaces within the room such as walls, ceiling, and other reflective objects which shape the sound. The result of this space is to deliver an optimal sound experience with the listener located at a well-defined location, sometimes referred to as the "sweet spot" in the room. However, it is not practical for many audio professionals to utilize sonically-treated spaces, such as recording studios. These spaces typically cost money, may be in inconvenient locations, and require advance reservations. Yet many professionals prefer to work with headphones.

The physical space emulation described in this disclosure enables creating all of the effects of a professionally-treated physical space within headphones, whenever and where ever inspiration strikes. By modeling multiple different recording studio spaces and allowing the user to alternately selecting them, the content creator can even test their work in different virtual studios with the same set of headphones—even if the studios are geographically dispersed. For example, a recording engineer can test their work in an emulated studio located in Los Angeles, another studio in London, and a third in Nashville, all with the same set of headphones.

Example Application 2

Our perception is trained to sense stereo sound in three-dimensional space. Traditional stereo headphones isolate our two ears and destroy that perception. Many people prefer to perceive sound with the sensation of emulated 3D space. For example, music sounds more natural and less fatiguing according to this disclosure and is generally more desirable. Since most music is created in carefully designed recording studios, adding emulation of a studio space to music allows the listener to enjoy a sonic experience that is similar to that intended by the producer, recording engineer and artist creators. Additionally, live venue spaces can also be emulated, allowing the listener to experience music as if she were hearing it in a dance club, concert hall, outside concert venue, or any other physical space which can be modeled.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

The invention claimed is:

1. A method for enhancing audio reproduced by an audio reproduction device, including:
   generating a plurality of convolution coefficients for a predefined space, based on both a direct and reflected sound waves from the predefined space, for at least two channels;
   modifying at least two channels of digital audio signal received for reproduction based on the generated plurality of convolution coefficients for the predefined space, to generate a convolved digital audio signal for the at least two channels of digital audio signal with effect of the predefined space;
   adding correction to the generated convolved digital audio signal with mid side modification based on a middle-side filter to generate a modified convolved digital audio signal;
   generating at least two channels of convolved analog audio signal with effect of the predefined space, based on the modified convolved digital audio signal with effect of the predefined space, for the at least two channels of digital audio signal;
   and feeding the at least two channels of convolved analog audio signal with effect of the predefined space to the audio reproduction device, for reproduction.

2. The method of claim 1, further including, adding a controlled harmonic distortion associated with a physical speaker to the convolved digital audio signal.

3. The method of claim 2, wherein the physical speaker is a subwoofer speaker.

4. The method of claim 1, wherein, the digital audio signal including a left channel audio signal and a right channel audio signal, and wherein the audio reproduction device having a left driver and a right driver, wherein the left channel audio signal fed to the left driver includes a combination of a portion of a convolved left channel audio signal, a portion of a convolved right channel audio signal and a portion of convolved reflected audio signals.

5. The method of claim 4, wherein, wherein the right channel audio signal fed to the right driver includes a combination of a portion of a convolved right channel audio signal, a portion of a convolved left channel audio signal, and a portion of convolved reflected audio signals.

6. The method of claim 1, further including,
   optimizing frequency response characteristics of the modified analog signal for a left driver and a right driver of the audio reproduction device, by an analog output tuner.

7. A method for enhancing audio reproduced by an audio reproduction device, including:
   generating a plurality of convolution coefficients for a predefined space;
   modifying a digital audio signal based on the generated plurality of convolution coefficients for the predefined space, to generate a convolved digital audio signal;
   generating a convolved analog audio signal based on the convolved digital audio signal;
   feeding the convolved analog audio signal to the audio reproduction device; and
   adding correction to the digital audio signal with mid side modification based on a middle-side filter, before generating the analog audio signal.

8. The method of claim 7, further including, adding a controlled harmonic distortion associated with a physical speaker to the convolved digital audio signal.

9. The method of claim 7, wherein, the digital audio signal including a left channel audio signal and a right channel audio signal, and wherein the audio reproduction device having a left driver and a right driver, wherein the left channel audio signal fed to the left driver includes a combination of a portion of a convolved left channel audio signal, a portion of a convolved right channel audio signal and a portion of convolved reflected audio signals.

10. The method of claim 9, wherein, wherein the right channel audio signal fed to the right driver includes a combination of a portion of a convolved right channel audio signal, a portion of a convolved left channel audio signal, and a portion of convolved reflected audio signals.

11. A system for enhancing audio reproduced by an audio reproduction device, including:
   a plurality of convolution coefficients for a predefined space is generated, based on both a direct and reflected sound waves from the predefined space, for at least two channels;
   at least two channels of digital audio signal are modified based on the generated plurality of convolution coefficients for the predefined space, to generate a convolved digital audio signal for the at least two channels of digital audio signal with effect of the predefined space;
   correction to the generated convolved digital audio signal is added with mid side modification based on a middle-side filter to generate a modified convolved digital audio signal;
   at least two channels of convolved analog audio signal with effect of the predefined space is generated based on the at least two channels of modified convolved digital audio signal with effect of the predefined space; and the at least two channels of convolved analog audio signal with effect of the predefined space is fed to the audio reproduction device.

12. The system of claim 11, wherein a controlled harmonic distortion associated with a physical speaker is added to the convolved digital audio signal.

13. The system of claim 12, wherein the physical speaker is a subwoofer speaker.

14. The system of claim 11, wherein, the digital audio signal including a left channel audio signal and a right channel audio signal, and wherein the audio reproduction device having a left driver and a right driver, wherein the left channel audio signal fed to the left driver includes a combination of a portion of a convolved left channel audio signal, a portion of a convolved right channel audio signal, and a portion of convolved reflected audio signals.

15. The system of claim 14, wherein the right channel audio signal fed to the right driver includes a combination of a portion of a convolved right channel audio signal, a portion of a convolved left channel audio signal, and a portion of convolved reflected audio signals.

16. The system of claim 11, further including,
an analog output tuner configured to optimize frequency response characteristics of the modified analog signal for a left driver and a right driver of the audio reproduction device.

17. A system for enhancing audio reproduced by an audio reproduction device, including:

a plurality of convolution coefficients for a predefined space is generated;

a digital audio signal is modified based on the generated plurality of convolution coefficients for the predefined space, to generate a convolved digital audio signal;

a convolved analog audio signal is generated based on the convolved digital audio signal;

the convolved analog audio signal is fed to the audio reproduction device; and add a correction to the convolved digital audio signal with mid side modification based on a middle-side filter, before the analog audio signal is generated.

18. The system of claim 17, wherein a controlled harmonic distortion associated with a physical speaker is added to the convolved digital audio signal.

19. The system of claim 17, wherein, the digital audio signal including a left channel audio signal and a right channel audio signal, and wherein the audio reproduction device having a left driver and a right driver, wherein the left channel audio signal fed to the left driver includes a combination of a portion of a convolved left channel audio signal, a portion of a convolved right channel audio signal, and a portion of convolved reflected audio signals.

20. The system of claim 19, wherein the right channel audio signal fed to the right driver includes a combination of a portion of a convolved right channel audio signal, a portion of a convolved left channel audio signal, and a portion of convolved reflected audio signals.

* * * * *